(12) United States Patent
Chui et al.

(10) Patent No.: US 8,213,075 B2
(45) Date of Patent: *Jul. 3, 2012

(54) METHOD AND DEVICE FOR MULTISTATE INTERFEROMETRIC LIGHT MODULATION

(75) Inventors: Clarence Chui, San Jose, CA (US); William J Cummings, San Jose, CA (US); Brian J Gally, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,884

(22) Filed: Nov. 5, 2010

(65) Prior Publication Data

US 2011/0044496 A1 Feb. 24, 2011

Related U.S. Application Data

(63) Continuation of application No. 12/115,829, filed on May 6, 2008, now Pat. No. 7,839,557, which is a continuation of application No. 11/112,734, filed on Apr. 22, 2005, now Pat. No. 7,372,613.

(60) Provisional application No. 60/613,486, filed on Sep. 27, 2004, provisional application No. 60/613,499, filed on Sep. 27, 2004.

(51) Int. Cl.
*G02B 26/12* (2006.01)

(52) U.S. Cl. ............. 359/290; 359/224.2; 359/291; 359/292; 359/295; 359/298; 359/318; 345/85; 348/770; 348/771

(58) Field of Classification Search ............ 359/223, 359/224, 290–292, 295, 298, 315, 318; 345/85; 348/770–772

See application file for complete search history.

(56) References Cited

U.S. PATENT DOCUMENTS

| 2,590,906 A | 4/1952 | Tripp |
| 2,677,714 A | 5/1954 | Auwarter |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |

(Continued)

FOREIGN PATENT DOCUMENTS

EP          0 035 299          9/1983

(Continued)

OTHER PUBLICATIONS

Conner, Hybrid Color Display Using Optical Interference Filter Array, SID Digest, pp. 577-580 (1993).

(Continued)

*Primary Examiner* — Evelyn A. Lester
(74) *Attorney, Agent, or Firm* — Knobbe, Martens, Olson & Bear LLP

(57) ABSTRACT

A multi-state light modulator comprises a first reflector. A first electrode is positioned at a distance from the first reflector. A second reflector is positioned between the first reflector and the first electrode. The second reflector is movable between an undriven position, a first driven position, and a second driven position, each having a corresponding distance from the first reflector. In one embodiment, the three positions correspond to reflecting white light, being non-reflective, and reflecting a selected color of light. Another embodiment is a method of making the light modulator. Another embodiment is a display including the light modulator.

34 Claims, 10 Drawing Sheets

U.S. PATENT DOCUMENTS

| | | |
|---|---|---|
| 3,955,190 A | 5/1976 | Teraishi |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zahowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | goossen |
| 5,719,068 A | 2/1998 | Suzawa et al. |
| 5,734,177 A | 3/1998 | Sakamoto |
| 5,771,116 A | 6/1998 | Miller et al. |
| 5,784,190 A | 7/1998 | Worley |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | goossen |
| 5,838,484 A | 11/1998 | Goossen et al. |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,097,145 A | 8/2000 | Kastalsky et al. |
| 6,100,861 A | 8/2000 | Cohen et al. |
| 6,124,851 A | 9/2000 | Jacobsen |
| 6,195,196 B1 | 2/2001 | Kimura et al. |
| 6,242,932 B1 | 6/2001 | Hembree |
| 6,262,697 B1 | 7/2001 | Stephenson |
| 6,301,000 B1 | 10/2001 | Johnson |
| 6,323,987 B1 | 11/2001 | Rinaudo et al. |
| 6,327,071 B1 | 12/2001 | Kimura |
| 6,335,235 B1 | 1/2002 | Bhekta et al. |
| 6,351,329 B1 | 2/2002 | Greywall |
| 6,356,378 B1 | 3/2002 | Huibers |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,738,194 B1 | 5/2004 | Ramirez et al. |
| 6,768,555 B2 | 7/2004 | Chen |
| 6,794,119 B2 | 9/2004 | Miles |
| 6,813,059 B2 | 11/2004 | Hunter et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,372,613 B2 | 5/2008 | Chui et al. |
| 7,372,619 B2 | 5/2008 | Miles |
| 7,459,402 B2 | 12/2008 | Doan et al. |
| 7,460,291 B2 | 12/2008 | Sampsell et al. |
| 7,476,327 B2 | 1/2009 | Tung et al. |
| 7,508,566 B2 | 3/2009 | Feenstra et al. |
| 7,532,377 B2 | 5/2009 | Miles |
| 7,550,794 B2 | 6/2009 | Miles et al. |
| 7,554,711 B2 | 6/2009 | Miles |
| 7,672,035 B2 | 3/2010 | Sampsell et al. |
| 7,692,844 B2 | 4/2010 | Miles |
| 7,704,772 B2 | 4/2010 | Tung et al. |
| 7,738,157 B2 | 6/2010 | Miles |
| 7,839,557 B2 * | 11/2010 | Chui et al. .................. 359/290 |
| 7,852,544 B2 | 12/2010 | Sampsell |
| 7,898,722 B2 | 3/2011 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |

| | | | | | |
|---|---|---|---|---|---|
| 2002/0146200 A1 | 10/2002 | Kurdle et al. | 2010/0039370 A1 | 2/2010 | Miles |
| 2002/0149828 A1 | 10/2002 | Miles | 2011/0019380 A1 | 1/2011 | Miles |
| 2002/0149834 A1 | 10/2002 | Mei et al. | 2011/0026096 A1 | 2/2011 | Miles |
| 2002/0154422 A1 | 10/2002 | Sniegowski et al. | 2011/0038027 A1 | 2/2011 | Miles |
| 2002/0197761 A1 | 12/2002 | Patel et al. | 2011/0080632 A1 | 4/2011 | Miles |
| 2003/0011864 A1 | 1/2003 | Flanders | 2011/0170166 A1 | 7/2011 | Miles |
| 2003/0016428 A1 | 1/2003 | Kato et al. | 2011/0170167 A1 | 7/2011 | Miles |
| 2003/0035196 A1 | 2/2003 | Walker | 2011/0188110 A1 | 8/2011 | Miles |
| 2003/0043157 A1 | 3/2003 | Miles | | | |
| 2003/0053078 A1 | 3/2003 | Missey et al. | | | |
| 2003/0119221 A1 | 6/2003 | Cunningham et al. | | | |
| 2003/0123125 A1 | 7/2003 | Little | | | |
| 2003/0138669 A1 | 7/2003 | Kojima et al. | | | |
| 2003/0173504 A1 | 9/2003 | Cole et al. | | | |
| 2003/0202265 A1 | 10/2003 | Reboa et al. | | | |
| 2003/0202266 A1 | 10/2003 | Ring et al. | | | |
| 2004/0008396 A1 | 1/2004 | Stappaerts | | | |
| 2004/0008438 A1 | 1/2004 | Sato | | | |
| 2004/0027671 A1 | 2/2004 | Wu et al. | | | |
| 2004/0027701 A1 | 2/2004 | Ishikawa | | | |
| 2004/0043552 A1 | 3/2004 | Strumpell et al. | | | |
| 2004/0051929 A1 | 3/2004 | Sampsell et al. | | | |
| 2004/0066477 A1 | 4/2004 | Morimoto et al. | | | |
| 2004/0075967 A1 | 4/2004 | Lynch et al. | | | |
| 2004/0076802 A1 | 4/2004 | Tompkin et al. | | | |
| 2004/0080035 A1 | 4/2004 | Delapierre | | | |
| 2004/0100594 A1 | 5/2004 | Huibers et al. | | | |
| 2004/0100677 A1 | 5/2004 | Huibers et al. | | | |
| 2004/0125281 A1 | 7/2004 | Lin et al. | | | |
| 2004/0125282 A1 | 7/2004 | Lin et al. | | | |
| 2004/0145811 A1 | 7/2004 | Lin et al. | | | |
| 2004/0147198 A1 | 7/2004 | Lin et al. | | | |
| 2004/0175577 A1 | 9/2004 | Lin et al. | | | |
| 2004/0184134 A1 | 9/2004 | Makigaki | | | |
| 2004/0188599 A1 | 9/2004 | Viktorovitch et al. | | | |
| 2004/0207897 A1 | 10/2004 | Lin | | | |
| 2004/0209195 A1 | 10/2004 | Lin | | | |
| 2004/0217264 A1 | 11/2004 | Wood et al. | | | |
| 2004/0217919 A1 | 11/2004 | Pichi et al. | | | |
| 2004/0218251 A1 | 11/2004 | Piehl et al. | | | |
| 2004/0259010 A1 | 12/2004 | Kanbe | | | |
| 2005/0002082 A1 | 1/2005 | Miles | | | |
| 2005/0003667 A1 | 1/2005 | Lin et al. | | | |
| 2005/0024557 A1 | 2/2005 | Lin | | | |
| 2005/0035699 A1 | 2/2005 | Tsai | | | |
| 2005/0036095 A1 | 2/2005 | Yeh et al. | | | |
| 2005/0046919 A1 | 3/2005 | Taguchi et al. | | | |
| 2005/0046922 A1 | 3/2005 | Lin et al. | | | |
| 2005/0046948 A1 | 3/2005 | Lin | | | |
| 2005/0068627 A1 | 3/2005 | Nakamura et al. | | | |
| 2005/0078348 A1 | 4/2005 | Lin | | | |
| 2005/0117190 A1 | 6/2005 | Iwauchi et al. | | | |
| 2005/0117623 A1 | 6/2005 | Shchukin et al. | | | |
| 2005/0128543 A1 | 6/2005 | Phillips et al. | | | |
| 2005/0133761 A1 | 6/2005 | Thielemans | | | |
| 2005/0168849 A1 | 8/2005 | Lin | | | |
| 2005/0179378 A1 | 8/2005 | Oooka et al. | | | |
| 2005/0195462 A1 | 9/2005 | Lin | | | |
| 2005/0275930 A1 | 12/2005 | Patel et al. | | | |
| 2006/0007517 A1 | 1/2006 | Tsai | | | |
| 2006/0017379 A1 | 1/2006 | Su et al. | | | |
| 2006/0017689 A1 | 1/2006 | Faase et al. | | | |
| 2006/0024880 A1 | 2/2006 | Chui et al. | | | |
| 2006/0038643 A1 | 2/2006 | Xu et al. | | | |
| 2006/0065940 A1 | 3/2006 | Kothari | | | |
| 2006/0082863 A1 | 4/2006 | Piehl et al. | | | |
| 2006/0220160 A1 | 10/2006 | Miles | | | |
| 2006/0262126 A1 | 11/2006 | Miles | | | |
| 2007/0020948 A1 | 1/2007 | Piehl et al. | | | |
| 2007/0040777 A1 | 2/2007 | Cummings | | | |
| 2007/0153860 A1 | 7/2007 | Chang-Hasnain et al. | | | |
| 2007/0177247 A1 | 8/2007 | Miles | | | |
| 2007/0253054 A1 | 11/2007 | Miles | | | |
| 2008/0037093 A1 | 2/2008 | Miles | | | |
| 2008/0088904 A1 | 4/2008 | Miles | | | |
| 2008/0088910 A1 | 4/2008 | Miles | | | |
| 2008/0088912 A1 | 4/2008 | Miles | | | |
| 2008/0106782 A1 | 5/2008 | Miles | | | |
| 2008/0297880 A1 | 12/2008 | Steckl et al. | | | |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 640 765 | 3/2006 |
| EP | 1 643 288 | 4/2006 |
| FR | 2 824 643 | 11/2002 |
| JP | 56-088111 | 7/1981 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| TW | 200522132 | 7/2005 |
| WO | WO 98/14804 | 4/1998 |
| WO | WO 98/43129 | 10/1998 |
| WO | WO 01/53113 | 7/2001 |
| WO | WO 02/24570 | 3/2002 |
| WO | WO 02/086582 | 10/2002 |
| WO | WO 03/105198 | 12/2003 |
| WO | WO 2005/122123 | 12/2005 |
| WO | WO 2006/036386 | 4/2006 |
| WO | WO 2008/057228 | 5/2008 |

OTHER PUBLICATIONS

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Longhurst, 1963, Chapter IX: Multiple Beam Interferometry, in Geometrical and Physical Optics, pp. 153-157.

Miles, A New Reflective FPD Technology Using Interferometric Modulation, Journal of the SID, May 4, 1997.

Miles, Interferometric modulation: MOEMS as an enabling technology for high performance reflective displays, Proceedings of SPIE, 4985:131-139, 2003.

Pape et al., Characteristics of the deformable mirror device for optical information processing, Optical Engineering, 22(6):676-681, Nov.-Dec. 1983.

Tolansky, 1948, Chapter II: Multiple-Beam Interference, in Multiple-bean Interferometry of Surfaces and Films, Oxford at the Clarendon Press, pp. 8-11.

Office Action mailed Apr. 20, 2007 in U.S. Appl. No. 11/112,734.
Office Action mailed Oct. 10, 2007 in U.S. Appl. No. 11/112,734.
Office Action dated Jun. 24, 2010 in U.S. Appl. No. 11/772,777.
European Search Report for App. No. 05255637.0, dated Nov. 22, 2005.
First Office Action in Chinese App. No. 200510105050.7, dated Mar. 28, 2008.
Second Office Action in Chinese App. No. 200510105050.7, dated Oct. 24, 2008.
Notice of Reasons for Rejection dated Aug. 26, 2008 in Japanese App. No. 2005-250539.
Final Notice of Rejection dated Nov. 10, 2010 in Japanese App. No. 2005-250539.
ISR and WO for PCT/US08/068063 filed Jun. 24, 2008.
IPRP for PCT/US08/068063 dated Sep. 24, 2009.
Office Action dated Jan. 7, 2010 in U.S. Appl. No. 12/115,829.
Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.
Cacharelis et al., 1997, A Reflective-mode PDLC Light Valve Display Technology, Proceedings of European Solid State Device Research Conference (ESSDERC), pp. 596-599.
Maier et al., 1996, 1.3" active matrix liquid crystal spatial light modulator with 508 dpi resolution, SPIE vol. 2754, pp. 171-179.
Official Communication dated Jun. 6, 2011 in European App. No. 05255637.0.
Nakagawa et al., Feb. 1, 2002, Wide-field-of-view narrow-band spectral filters based on photonic crystal nanocavities, Optics Letters, 27(3):191-193.

Billard, Tunable Capacitor, 5th Annual Review of LETI, Jun. 24, 2003, p. 7.
Hohlfeld et al., Jun. 2003, Micro-machined tunable optical filters with optimized band-pass spectrum, 12th International Conference on Transducers, Solid-State Sensors, Actuators and Microsystems, 2:1494-1497.
Mehregany et al., 1996, MEMS applicatons in optical systems, IEEE/LEOS 1996 Summer Topical Meetings, pp. 75-76.
Miles et al, Oct. 21, 1997, A MEMS based interferometric modulator (IMOD) for display applications, Proceedings of Sensors Expo, pp. 281-284.
Nieminen et al., 2004, Design of a temperature-stable RF MEM capacitor, IEEE Journal of Microelectromechanical Systems, 13(5):705-714.
Wang, Jun. 29-Jul. 1, 2002, Design and fabrication of a novel two-dimenstion MEMS-based tunable capacitor, IEEE 2002 International Conference on Communications, Circuits and Systems and West Sino Expositions, 2:1766-1769.
Office Action dated Dec. 1, 2010 in U.S. Appl. No. 11/772,777.
Extended European Search Report dated Aug. 19, 2011 in App. No. 08075221.5.
Office Action dated Apr. 13, 2011 in Chinese App. No. 200880023131.4.
Office Action dated Oct. 24, 2011 in Chinese App. No. 200880023131.4.
Office Action dated Dec. 13, 2011 in U.S. Appl. No. 13/086,113.

* cited by examiner

| | Column Output Signals | |
|---|---|---|
| | +$V_{bias}$ | -$V_{bias}$ |
| 0 | Stable | Stable |
| +$\Delta V$ | Release | Actuate |
| -$\Delta V$ | Actuate | Release |

Row Output Signals

US 8,213,075 B2

METHOD AND DEVICE FOR MULTISTATE INTERFEROMETRIC LIGHT MODULATION

CROSS-REFERENCE TO RELATED APPLICATIONS

This application is a continuation of U.S. patent application Ser. No. 12/115,829, filed May 6, 2008, which is a continuation of U.S. patent application Ser. No. 11/112,734, filed Apr. 22, 2005, now U.S. Pat. No. 7,372,613, which claims the benefit of U.S. Provisional Application No. 60/613,486 filed Sep. 27, 2004, and U.S. Provisional Application No. 60/613,499 filed Sep. 27, 2004. Each of the foregoing applications is incorporated in its entirety by reference herein.

BACKGROUND

1. Field

The field of the invention relates to microelectromechanical systems (MEMS).

2. Background

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment is a light modulator. The light modulator includes a fixed reflector comprising an electrically conductive layer and a partially reflective layer. The light modulator further comprises an electrode positioned at a distance from the fixed reflector and defining a first cavity therebetween. The light modulator further comprises a movable reflector comprising an electrically conductive material. The movable reflector is positioned between the fixed reflector and the electrode. The movable reflector is movable between an undriven position, a first driven position, and a second driven position. The first driven position is closer to the fixed reflector than is the undriven position and the second driven position is farther from the fixed reflector than is the undriven position.

Another embodiment is a light modulator comprising a first reflector, a first electrode positioned at a distance from the first reflector, and a second reflector positioned between the first reflector and the first electrode. The second reflector is movable between an undriven position, a first driven position, and a second driven position. The first driven position is closer to the first reflector than is the undriven position and the second driven position is farther from the first reflector than is the undriven position.

Another embodiment is a method of driving a MEMS device comprising a first electrode, a second electrode, and a movable electrode positioned between the first electrode and the second electrode and configured to move to at least two positions therebetween. The method includes applying a first voltage potential difference between the first electrode and the movable electrode so as to drive the movable electrode to a position substantially in contact with a dielectric layer, wherein an attractive force is created between the movable electrode and the dielectric layer. The method further includes applying a second voltage potential difference between the first electrode and the movable electrode and a third voltage potential difference between the second electrode and the movable electrode so as to overcome the attractive force between the movable electrode and the dielectric layer and to drive the movable electrode away from the dielectric layer.

Another embodiment is a method of fabricating a multistate light modulator. The method includes forming a first reflector. The method further includes forming a first electrode positioned at a distance from the first reflector. The method further includes forming a second reflector positioned between the first reflector and the first electrode. The second reflector is made movable between an undriven position, a first driven position, and a second driven position, wherein the first driven position is closer to the first reflector than is the undriven position and wherein the second driven position is farther from the first reflector than is the undriven position.

Another embodiment is a display comprising a plurality of display elements. Each of the display elements includes a first reflective member, a first conductive member positioned at a distance from the first reflective member, and a second reflective member positioned between the first reflective member and the first conductive member. The second reflective member is movable between an undriven position, a first driven position, and a second driven position. The first driven position is closer to the first reflective member than is the undriven position and the second driven position is farther from the first reflective member than is the undriven position.

DETAILED DESCRIPTION OF PREFERRED EMBODIMENTS

An interferometric modulator has a reflector which is movable between three positions. In an undriven state of the modulator, the movable mirror is in an undriven position. In a first driven state of the modulator, the movable mirror is deflected toward a fixed mirror to a first driven position which is closer to the fixed mirror than is the undriven position. In a second driven state of the modulator, the movable mirror is deflected away from the fixed mirror to a second driven position which is farther from the fixed mirror than is the undriven position. In one embodiment, the modulator is non-reflective, e.g., black, when the movable mirror is in the undriven position, reflects white light when the movable mirror is in the first driven position, and reflects a selected color of light when the movable mirror is in the second driven position. A color display including such modulators thus reflects relatively intense white light while having a large color gamut.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
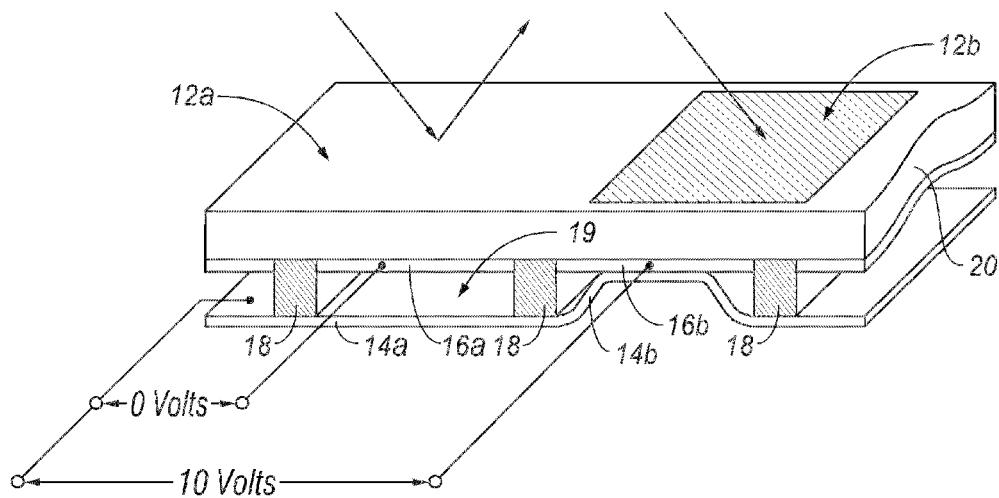
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
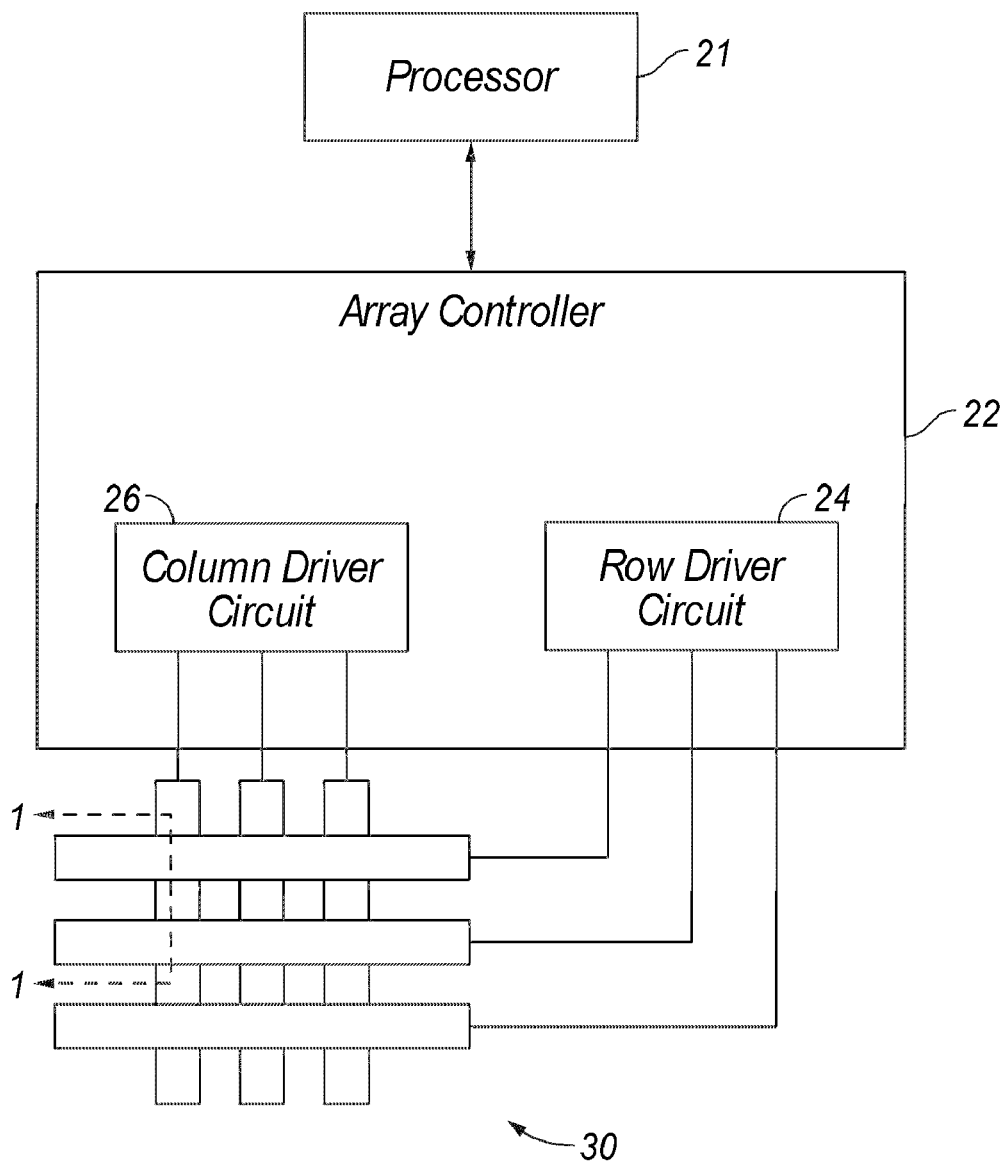
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
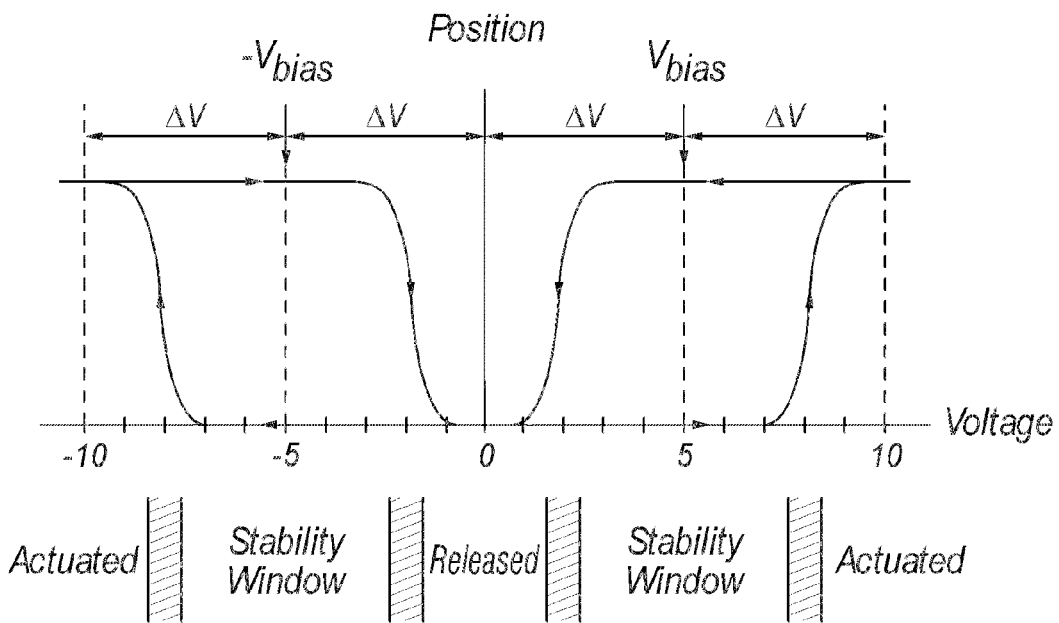
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
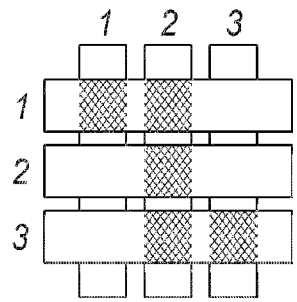
FIGS. 5A and 5B illustrate one exemplary timing diagram for row and column signals that may be used to write a frame of display data to the 3×3 interferometric modulator display of FIG. 2.
Figure 5B:
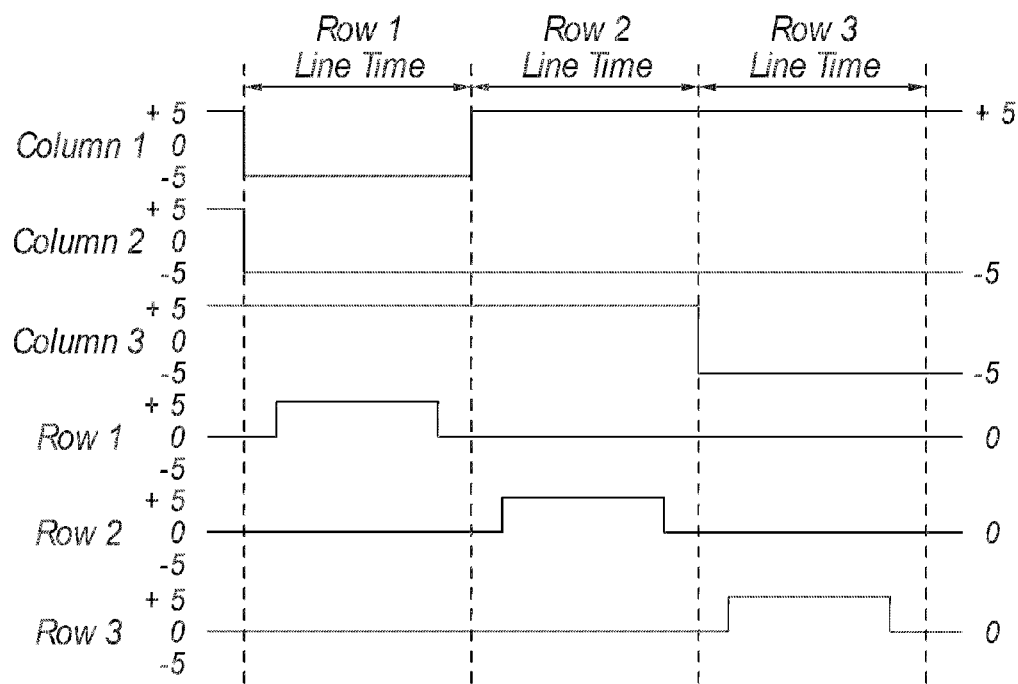

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
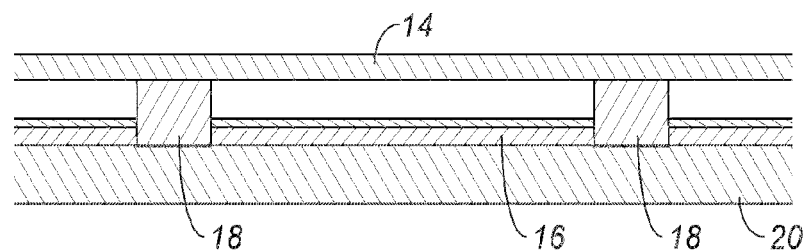
FIG. 6A is a cross section of the device of FIG. 1.
Figure 6B:
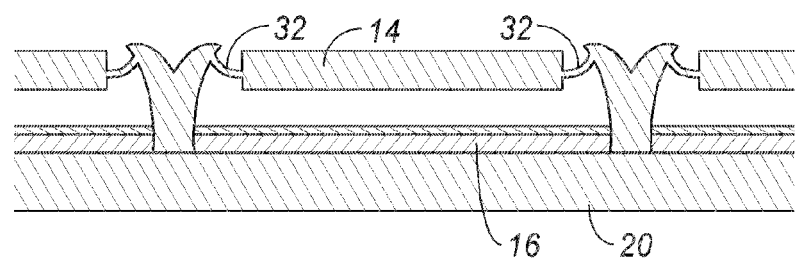
FIG. 6B is a cross section of an alternative embodiment of an interferometric modulator.
Figure 6C:
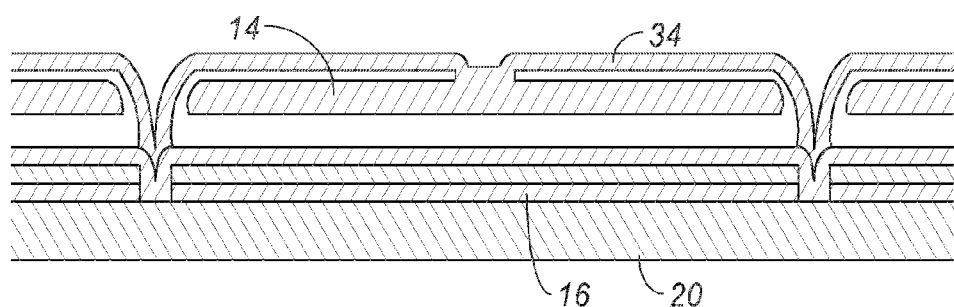
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Embodiments of interferometric modulators described above operate in one of a reflective state, which produces white light, or light of a color determined by the distance between the mirrors 14 and 16, or in a non-reflective, e.g., black, state. In other embodiments, for example, embodiments disclosed in U.S. Pat. No. 5,986,796, the movable mirror 14 may be positioned at a range of positions relative to the fixed mirror 16 to vary the size of the resonant gap 19, and thus the color of reflected light.

Figure 7:
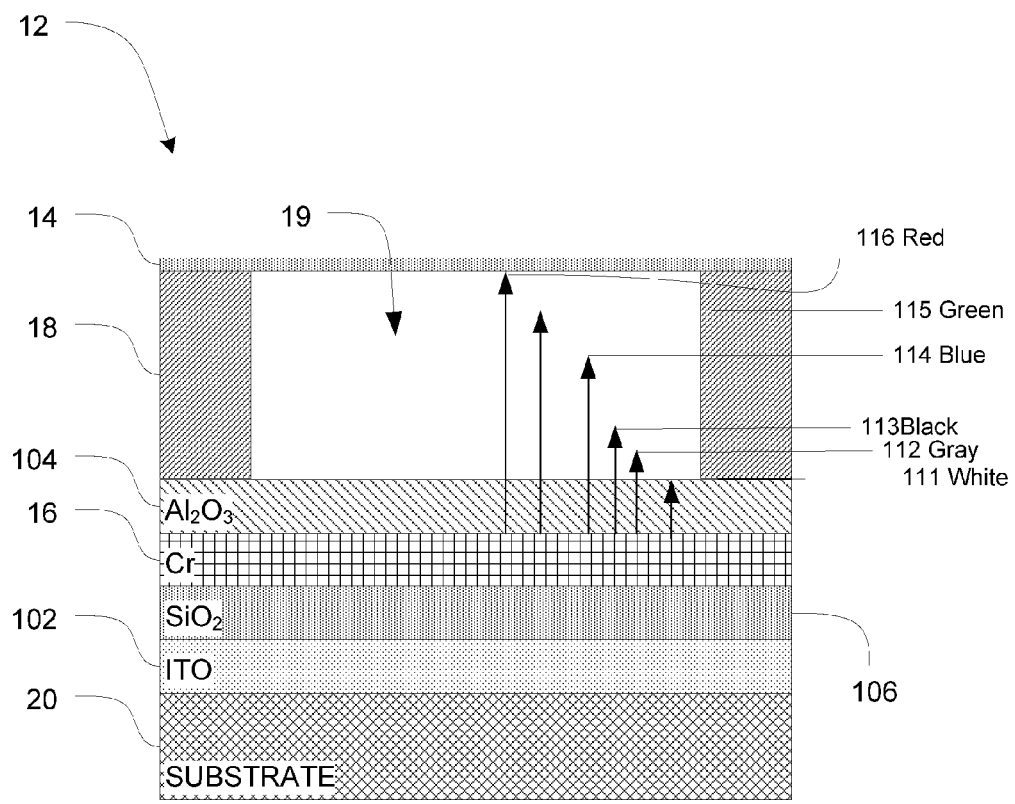
FIG. 7 is a side cross-sectional view of an exemplary interferometric modulator that illustrates the spectral characteristics of produced light.
Figure 7:
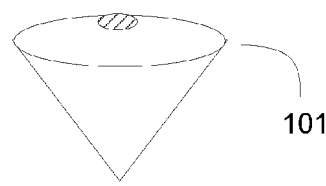

FIG. 7 is a side cross-sectional view of an exemplary interferometric modulator 12 that illustrates the spectral characteristics of light that would be produced by positioning the movable mirror 14 at a range of positions 111-115. As discussed above, a potential difference between a row and column electrode causes the movable mirror 14 to deflect. The exemplary modulator includes a conductive layer 102 of indium-tin-oxide (ITO) acting as a column electrode. In the exemplary modulator, the mirror 14 includes the row conductor.

In one embodiment, a dielectric layer 104 of a material such as alumina ($Al_2O_3$) is positioned over a layer of chrome that forms a reflective surface of the mirror 16. As discussed above with reference to FIG. 1, the dielectric layer 104 prevents shorting and controls the separation distance between the mirrors 14 and 16 when the mirror 14 deflects. The optical cavity formed between the mirrors 14 and 16 thus includes the dielectric layer 104. The relative sizes of items in FIG. 7 have been selected for purposes of conveniently illustrating the modulator 12. Thus, such distances are not to scale and are not intended to be representative of any particular embodiment of the modulator 12.

Figure 8:
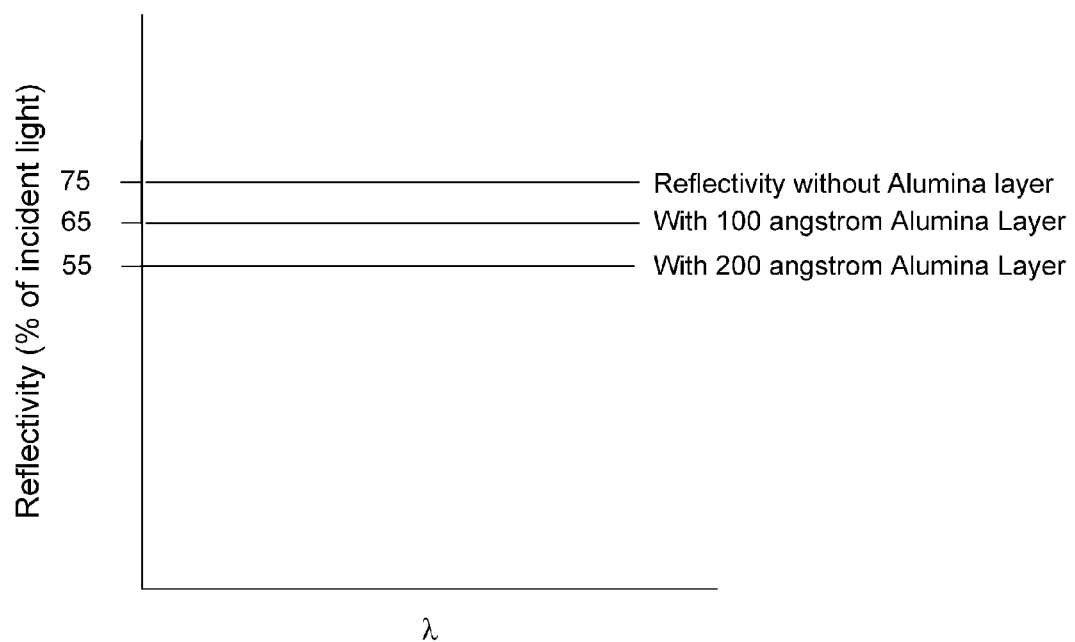
FIG. 8 is a graphical illustration of reflectivity versus wavelength for mirrors of several exemplary interferometric modulators.

FIG. 8 is a graphical illustration of reflectivity versus wavelength for the mirrors 16 of several exemplary optical stacks. The horizontal axis represents a range of wavelengths of visible light incident on the optical stacks. The vertical axis represents the reflectivity of the optical stack as a percentage of incident light at a particular wavelength. In one embodiment, in which the optical stack does not include the dielectric layer 104, the reflectivity of the mirror 16 formed of a layer of chrome is approximately 75%. An optical stack including a dielectric layer 104 comprising a 100 Å layer of alumina results in 65% reflectivity and a dielectric layer 104 comprising a 200 Å layer of alumina results in 55% reflectivity. As shown, reflectivity does not vary according to wavelength in these particular embodiments. Accordingly, by adjusting the thickness of an $Al_2O_3$ layer, the reflectivity of the mirror 16 can be controlled consistently across the visible spectrum to allow specific properties of interferometric modulators 12 to be selected. In certain embodiments, the dielectric layer 104 is a layer of $Al_2O_3$, having a thickness in the range of 50-250 Å. In other embodiments, the dielectric layer 104 comprises a thin layer of $Al_2O_3$, having a thickness in the range of 50-100 Å and a layer of bulk $SiO_2$, having a thickness in the range of 400-2000 Å.

As discussed above, the modulator 12 includes an optical cavity formed between the mirrors 14 and 16. The characteristic distance, or effective optical path length, L, of the optical cavity determines the resonant wavelengths, $\lambda$, of the optical cavity and thus of the interferometric modulator 12. The resonant wavelength, $\lambda$, of the interferometric modulator 12 generally corresponds to the perceived color of light reflected by the modulator 12. Mathematically, the distance $L=\frac{1}{2}N\lambda$, where N is an integer. A given resonant wavelength, $\lambda$, is thus reflected by interferometric modulators 12 having distances L of $\frac{1}{2}\lambda$ (N=1), $\lambda$ (N=2), $3/2\lambda$ (N=3), etc. The integer N may be referred to as the order of interference of the reflected light. As used herein, the order of a modulator 12 also refers to the order N of light reflected by the modulator 12 when the mirror 14 is in at least one position. For example, a first order red interferometric modulator 12 may have a distance L of about 325 nm, corresponding to a wavelength $\lambda$ of about 650 nm. Accordingly, a second order red interferometric modulator 12 may have a distance L of about 650 nm. Generally, higher order modulators 12 reflect light over a narrower range of wavelengths and thus produce colored light that is more saturated.

Note that in certain embodiments, the distance, L, is substantially equal to the distance between the mirrors 14 and 16. Where the space between the mirrors 14 and 16 comprises only a gas (e.g., air) having an index of refraction of approximately 1, the effective optical path length is substantially equal to the distance between the mirrors 14 and 16. In embodiments that include the dielectric layer 104, which has an index of refraction greater than one, the optical cavity is formed to have the desired optical path length by selecting the distance between the mirrors 14 and 16 and by selecting the thickness and index of refraction of the dielectric layer 104, or of any other layers between the mirrors 14 and 16. In one embodiment, the mirror 14 may be deflected one or more positions within a range of positions to output a corresponding range of colors. For example, the voltage potential difference between the row and column electrodes may be adjusted to deflect the mirror 14 to one of a range of positions in relation to the mirror 16. In general, the greatest level of control of the position of the mirror by adjusting voltage is near the undeflected position of the path of the mirror 14 (for example, for smaller deflections, such as deflections within about ⅓rd of the maximum deflection from the undeflected position of the mirror 14).

Each of a particular group of positions 111-115 of the movable mirror 14 is denoted in FIG. 7 by a line extending from the fixed mirror 16 to an arrow point indicating the positions 111-115. Thus, the distances 111-115 are selected so as to account for the thickness and index of refraction of the dielectric layer 104. When the movable mirror 14 deflects to each of the positions 111-115, each corresponding to a different distance, L, the modulator outputs light to a viewing position 101 with a different spectral response that corresponds to different colors of incident light being reflected by the modulator 12. Moreover, at position 111, the movable mirror 14 is sufficiently close to the fixed mirror 16, that the effects of interference are negligible and modulator 12 acts as a mirror that reflects substantially all colors of incident visible light substantially equally, e.g., as white light. The broadband mirror effect is caused because the small distance L is too small for optical resonance in the visible band. The mirror 14 thus merely acts as a reflective surface with respect to visible light.

As the gap is increased to the position 112, the modulator 12 exhibits a shade of gray as the increased gap distance between the mirrors 14 and 16 reduces the reflectivity of the mirror 14. At the position 113, the distance L is such that the cavity operates interferometrically but reflects substantially no visible wavelengths of light because the resonant wavelength is outside the visible range.

As the distance L is increased further, a peak spectral response of the modulator 12 moves into visible wavelengths. Thus, when the movable mirror 14 is at position 114, the modulator 12 reflects blue light. When the movable mirror 14 is at the position 115, the modulator 12 reflects green light. When the movable mirror 14 is at the non-deflected position 116, the modulator 12 reflects red light.

In designing a display using interferometric modulators 12, the modulators 12 may be formed so as to increase the color saturation of reflected light. Saturation refers to the intensity of the hue of color light. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color. In one embodiment, the modulator 12 is formed with a distance L corresponding to higher order of interference, e.g., 2nd or 3rd order, to increase the saturation of reflected color light.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. In general, the more saturated the primary colors, the greater the range of colors that can be produced by the display. In other embodiments, the display may include modulators 12 having sets of colors that define other color systems in terms of sets of primary colors other than red, green, and blue.

Figure 9:
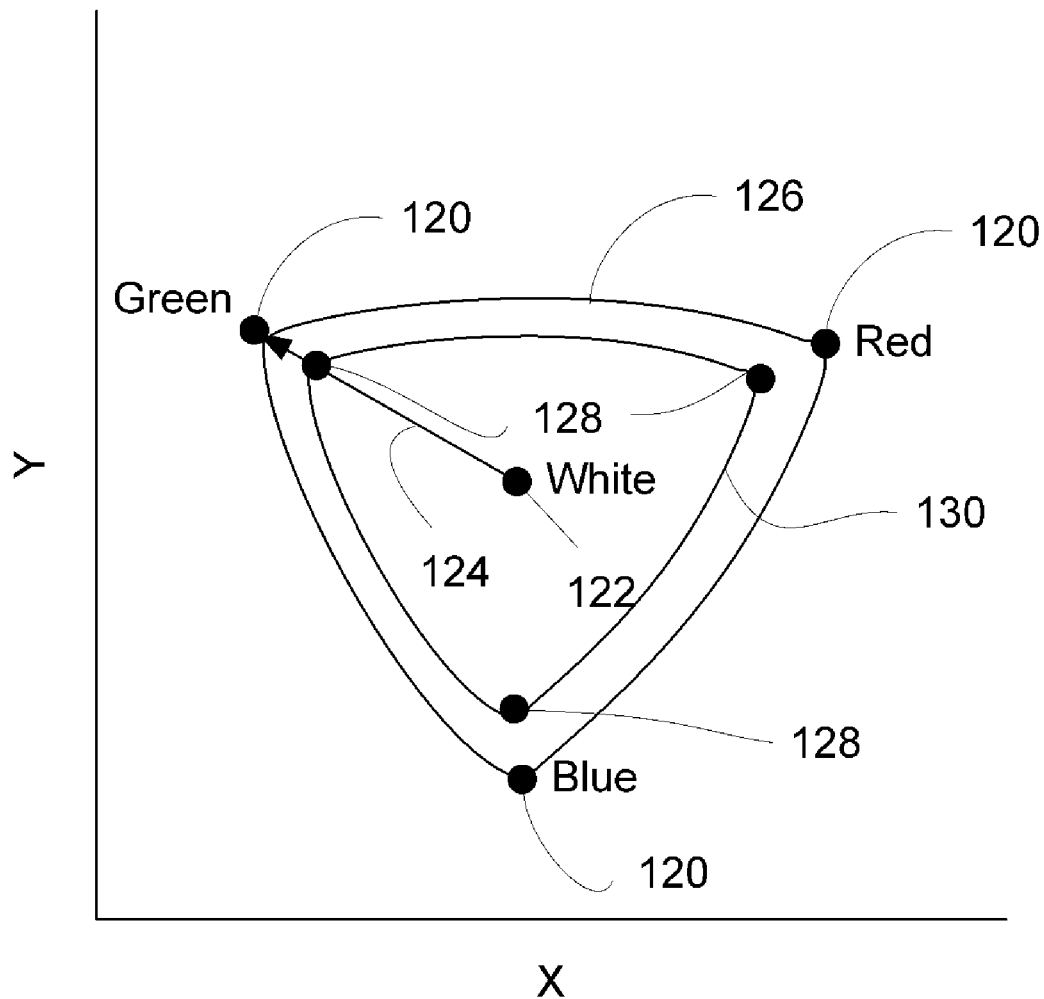
FIG. 9 is a chromaticity diagram that illustrates the colors that can be produced by a color display that includes exemplary sets of red, green, and blue interferometric modulators.

FIG. 9 is a chromaticity diagram that illustrates the colors that can be produced by a color display that includes two sets of exemplary red, green, and blue interferometric modulators. The horizontal and vertical axes define a chromaticity coordinate system on which spectral tristimulus values may be depicted. In particular, points 120 illustrate the color of light reflected by exemplary red, green, and blue interferometric modulators. White light is indicated by a point 122. The distance from each point 120 to the point 122 of white light, e.g., the distance 124 between the point 122 for white and the point 120 for green light, is indicative of the saturation of light produced by the corresponding modulator 12. The region enclosed by the triangular trace 126 corresponds to the range of colors that can be produced by mixing the light produced at points 120. This range of colors may be referred to as the color gamut of the display.

Points 128 indicate the spectral response of another set of exemplary modulators 12. As indicated by the smaller distance between the points 128 and the white point 122 than between points 120 and point 122, the modulators 12 corresponding to the points 128 produce less saturated light that do the modulators 12 corresponding to the points 120. The trace 130 indicates the range of colors that can be produced by mixing the light of points 128. As is shown in FIG. 9, the trace 126 encloses a larger area than does the trace 130, graphically illustrating the relationship between the saturation of the display elements and the size of the color gamut of the display.

In a reflective display, white light produced using such saturated interferometric modulators tends to have a relatively low intensity to a viewer because only a small range of incident wavelengths is reflected to form the white light. In contrast, a mirror reflecting broadband white light, e.g., substantially all incident wavelengths, has a greater intensity because a greater range of incident wavelengths is reflected. Thus, designing reflective displays using combinations of primary colors to produce white light generally results in a tradeoff between color saturation and color gamut and the brightness of white light output by the display.

Figure 10:
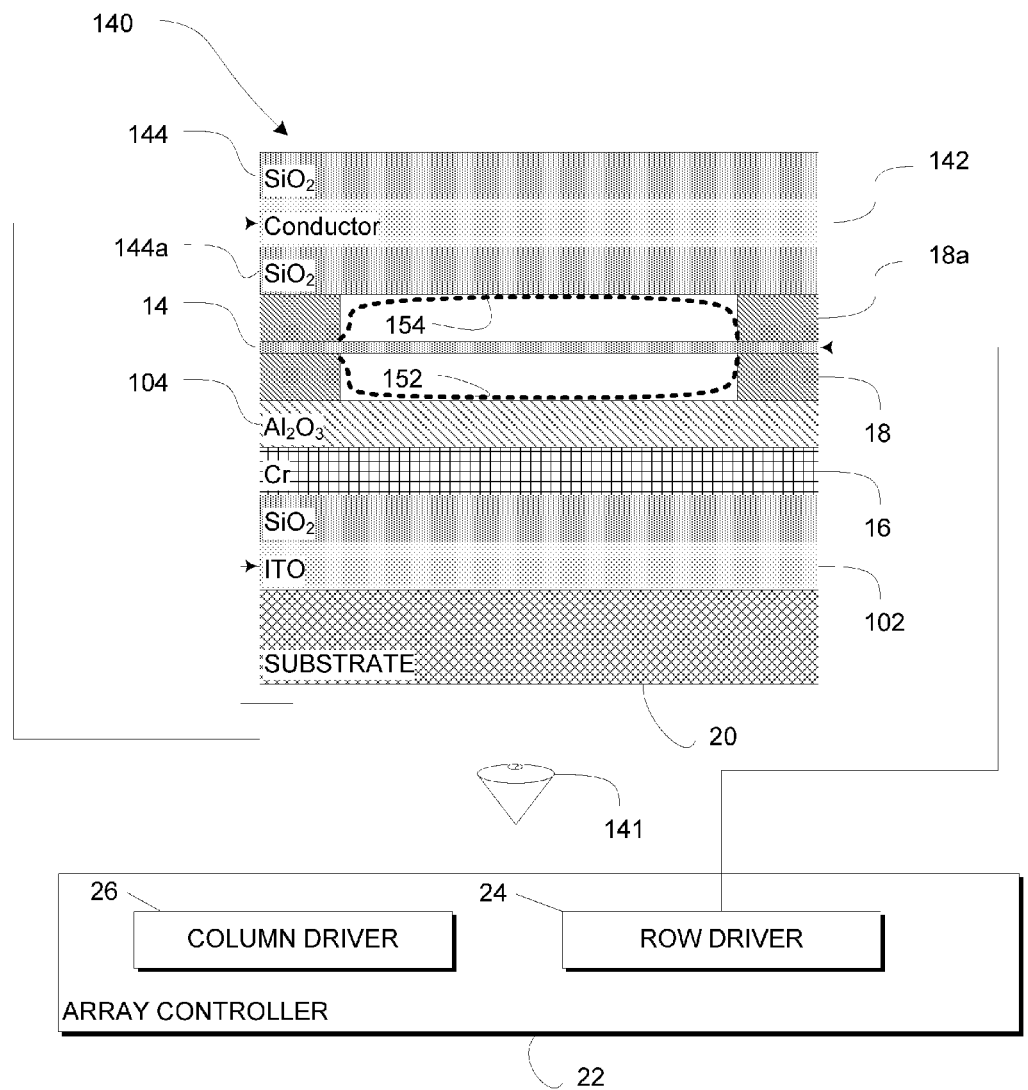
FIG. 10 is a side cross-sectional view of an exemplary multistate interferometric modulator.

FIG. 10 is a side cross-sectional view of an exemplary multistate interferometric modulator 140 that can produce highly saturated color light in one state and relatively intense white light in another state. The exemplary modulator 140 thus decouples color saturation from the brightness of output white light. The modulator 140 includes a movable mirror 14 that is positioned between two electrodes 102 and 142. The modulator 140 also includes a second set of posts 18*a* that are formed on the opposite side of the mirror 14 as the posts 18.

In certain embodiments, each of the mirrors 14 and 16 may be part of a stack of layers defining a reflector or reflective member that perform functions other than reflecting light. For example, in the exemplary modulator of FIG. 10, the mirror 14 is formed of one or more layers of a conductive and reflective material such as aluminum. Thus, the mirror 14 may also function as a conductor. Similarly, the mirror 16 may be formed of one or more layers of reflective material and one or more layers of an electrically conductive material so as to perform the functions of the electrode 102. Furthermore, each of the mirrors 14 and 16 may also include one or more layers having other functions, such as to control the mechanical properties affecting deflection of the mirror 14. In one embodiment, the moveable mirror 14 is suspended from an additional deformable layer such is described in connection with FIG. 6C.

In one embodiment that includes modulators that reflect red, green, and blue light, different reflective materials are used for modulators that reflect different colors so as to improve the spectral response of such modulators 12. For example, the movable mirror 14 may include gold in the modulators 12 configured to reflect red light.

In one embodiment, dielectric layers 144 may be positioned on either side of the conductor 142. The dielectric layers 144*a* and 104 advantageously prevent electrical shorts between conductive portions of the mirror 14 and other portions of the modulator 140. In one embodiment, the mirror 16 and the electrode 102 collectively form a reflective member.

In the exemplary embodiment, the distance between fixed mirror 16 and the movable mirror 14 in its undriven position corresponds to the optical path length L in which the modulator 140 is non-reflective or "black." In the exemplary embodiment, the optical path length between the fixed mirror 16 and the movable mirror 14 when driven towards the fixed mirror 16 corresponds to the optical path length L in which the modulator 140 reflects white light. In the exemplary embodiment, the distance between the fixed mirror 16 and the movable mirror 14 when driven towards the conductor 142 corresponds to the optical path length L in which the modulator 140 reflects light of a color such as red, blue, or green. In certain embodiments, the distance between the undriven movable mirror 14 and the fixed mirror 16 is substantially equal to the distance between the undriven movable mirror 14 and the electrode 142. Such embodiments may be considered to be two modulators positioned around the single movable mirror 14.

When a first voltage potential difference is applied between the mirror 14 and the electrode 102, the mirror 14 deflects towards the mirror 16 to define a first optical path length, L, that corresponds to a first driven state. In this first driven state, the movable mirror 14 is closer to the mirror 16 than in the undriven state. When a second voltage potential difference is applied between the mirror 14 and the electrode 142, the mirror 14 is deflected away from the mirror 16 to define a second optical path length, L, that corresponds to a second driven state. In this second driven state, the movable mirror 14 is farther from the mirror 16 than in the undriven state. In certain embodiments, at least one of the first driven state and second driven state is achieved by applying voltage potential differences both between the mirror 14 and the electrode 102 and between the mirror 14 and the electrode 142. In certain embodiments, the second voltage difference is selected to provide a desired deflection of the mirror 14.

As illustrated in FIG. 10, in the first driven state, the mirror 14 deflects to a position indicated by the dashed line 152. In the exemplary modulator 140, the distance between the mirrors 14 and 16 in this first driven state corresponds to the thickness of the dielectric layer 104. In the exemplary modulator 140, the mirror 14 acts as a broadband mirror in this position, substantially reflecting all visible wavelengths of light. As such, the modulator 140 produces a broadband white light when illuminated by broadband white light.

In the second driven state, the mirror 14 deflects to a position indicated by the dashed line 154. In the exemplary modulator 140, this distance corresponds to a color of light, e.g., blue light. In the undriven state, the mirror 14 is positioned as shown in FIG. 10. In the undeflected position, the mirror 14 is spaced at a distance from the mirror 16 so that substantially no visible light is reflected, e.g., an "off" or non-reflective state. Thus, the modulator 140 defines an interferometric modulator having at least three discrete states. In other embodiments, the positions of the movable mirror 14 in the three states may be selected so as to produce different sets of colors, including black and white, as desired.

In one embodiment, light enters the modulator 12 through the substrate 20 and is output to a viewing position 141. In another embodiment, the stack of layers illustrated in FIG. 10 is reversed, with layer 144 closest to the substrate 20 rather than layer 102. In certain such embodiments, the modulator 12 may be viewed through the opposite side of the stack from the substrate 20 rather than through the substrate 20. In one such embodiment, a layer of silicon dioxide is formed on the ITO layer 102 to electrically isolate the ITO layer 102.

As noted above, having a separate state for outputting white light in a modulator 140 decouples the selection of the properties of the modulator controlling color saturation from the properties affecting the brightness of white output. The distance and other characteristics of the modulator 140 may thus be selected to provide a highly saturated color without affecting the white light produced in the first state. For example, in an exemplary color display, one or more of the red, green, and blue modulators 12 may be formed with optical path lengths L corresponding to a higher order of interference.

The modulator 140 may be formed using lithographic techniques known in the art, and such as described above with reference to the modulator 12. For example, the fixed mirror 16 may be formed by depositing one or more layers of chromium onto the substantially transparent substrate 20. The electrode 102 may be formed by depositing one or more layers of a transparent conductor such as ITO onto the substrate 20. The conductor layers are patterned into parallel strips, and may form columns of electrodes. The movable mirror 14 may be formed as a series of parallel strips of a deposited metal layer or layers (orthogonal to the column electrodes 102) deposited on top of posts 18 and an intervening sacrificial material deposited between the posts 18. Vias through one or more of the layers described above may be provided so that etchant gas, such as xenon difluoride, can reach the sacrificial layers. When the sacrificial material is etched away, the deformable metal layers are separated from the fixed layers by an air gap. A highly conductive and reflective material such as aluminum may be used for the deformable layers, and these strips may form row electrodes in a display device. The conductor 142 may be formed by depositing posts 18a over the movable mirror 14, depositing an intervening sacrificial material between the posts 18a, depositing one or more layers of a conductor such as aluminum on top of the posts 18a, and depositing a conductive layer over the sacrificial material. When the sacrificial material is etched away, the conductive layer can serve as the electrode 142 which is separated from the mirror 14 by a second air gap. Each of the air gaps provides a cavity in which the mirror 14 may move to achieve each of the states described above.

As further illustrated in FIG. 10, in the exemplary modulator 140, the conductive mirror 14 is connected to the row driver 24 of the array controller 22. In the exemplary modulator 140, the conductors 102 and 142 are connected to separate columns in the column driver 26. In one embodiment, the state of the modulator 140 is selected by applying the appropriate voltage potential differences between the mirror 14 and the column conductors 102 and 142 according to the method described with reference to FIGS. 3 and 4.

Figure 11A:
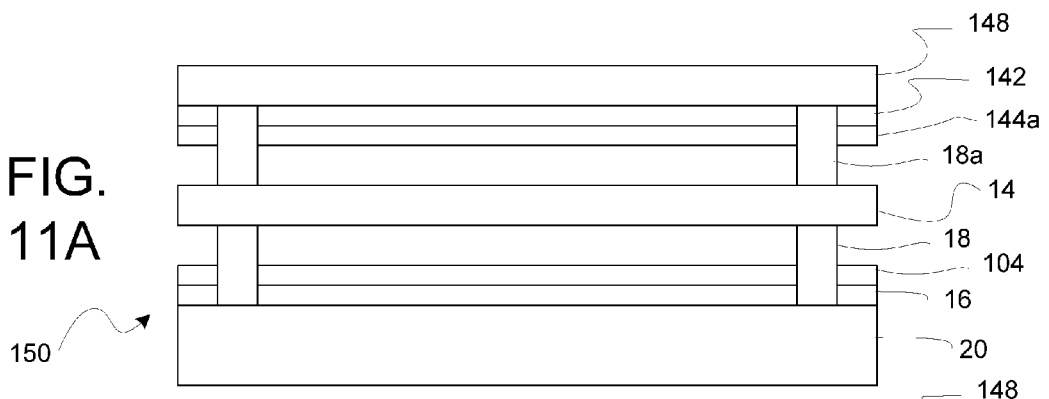
FIG. 11A-11C are side cross-sectional views of another exemplary multistate interferometric modulator.
Figure 11B:
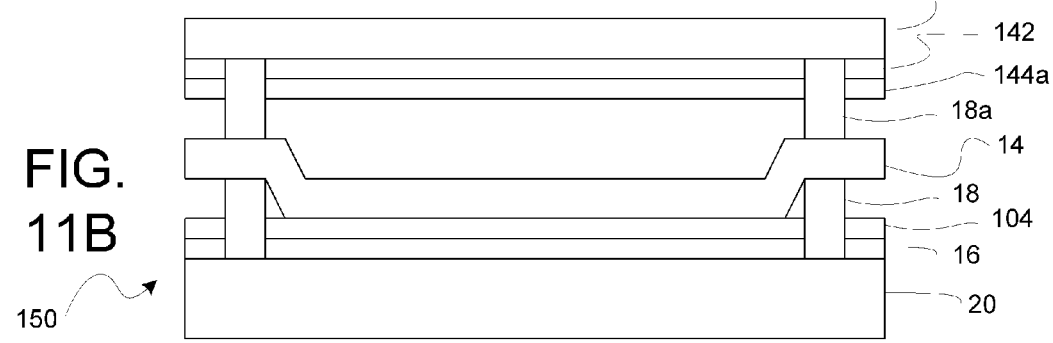
Figure 11C:
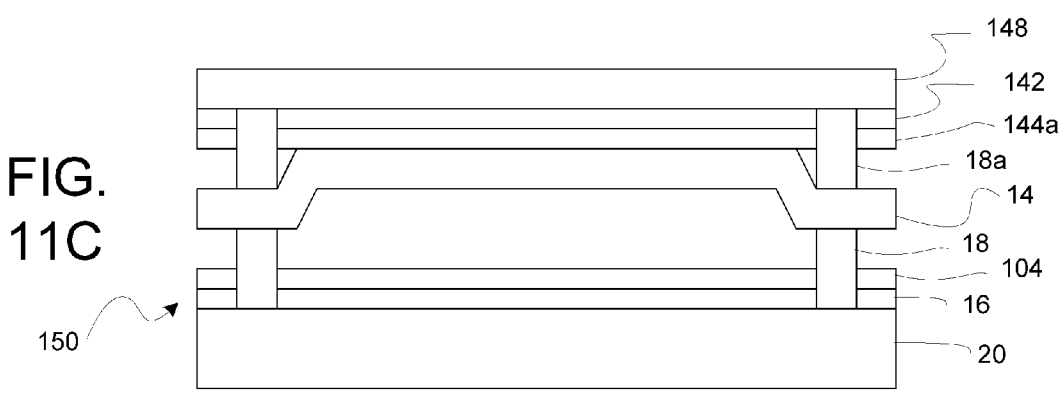

FIGS. 11A-11C illustrates another exemplary interferometric modulator 150 that provides more than two states. In the exemplary modulator 150, the mirror 16 includes both a reflective layer and a conductive layer so as to perform the function of the electrode 102 of FIG. 10. The conductive layer 142 can also be protected by a second dielectric layer 144a and supported by a support surface 148 that is maintained some distance above the movable mirror 14 through a second set of supports 18a.

FIG. 11A illustrates the undriven state of the modulator 150. As with the modulator 140 of FIG. 10, the mirror 14 of the exemplary modulator 150 of FIGS. 11A-11C is deflectable towards the dielectric layer 104 (e.g., downwards), as in the driven state illustrated FIG. 11B, and is deflectable in the reverse or opposite direction (e.g., upwards), as illustrated in FIG. 11C. This "upwardly" deflected state may be called the "reverse driven state."

As will be appreciated by one of skill in the art, this reverse driven state can be achieved in a number of ways. In one embodiment, the reverse driven state is achieved through the use of an additional charge plate or conductive layer 142 that can electrostatically pull the mirror 16 in the upward direction, as depicted in FIG. 11C. The exemplary modulator 150 includes what is basically two interferometric modulators positioned symmetrically around a single movable mirror 14. This configuration allows each of the conductive layer of the mirror 16 and the conductive layer 142 to attract the mirror 14 in opposite directions.

In certain embodiments, the additional conductive layer 142 may be useful as an electrode in overcoming stictional forces (static friction) that may develop when the mirror 14 comes in close proximity, or contacts, the dielectric layer 104. These forces can include van der Waals or electrostatic forces, as well as other possibilities as appreciated by one of skill in the art. In one embodiment, a voltage pulse applied to the conductive layer of the mirror 16 may send the movable mirror 14 into the "normal" driven state of FIG. 11B. Similarly, the next voltage pulse can be applied to the conductive layer 142 to attract the movable mirror 14 away from the mirror 16. In certain embodiments, such a voltage pulse applied to the conductive layer 142 can be used to accelerate the recovery of the movable mirror 14 back to the undriven state illustrated in FIG. 11A from the driven state illustrated in FIG. 11B by driving the movable mirror 14 towards the reverse driven state. Thus, in certain embodiments, the modulator 150 may operate in only two states, the undriven state of FIG. 11A and the driven state of FIG. 11B, and can employ the conductive layer 142 as an electrode to help overcome stictional forces. In one embodiment, the conductive layer 142 may be driven as described above each time that the modulator 150 changes from the driven position of FIG. 11C to the undriven position of FIG. 11A.

As will be appreciated by one of skill in the art, not all of these elements will be required in every embodiment. For example, if the precise relative amount of upward deflection (e.g., as shown in FIG. 11C) is not relevant in the operation of such embodiments, then the conductive layer 142 can be positioned at various distances from the movable mirror 14. Thus, there may be no need for support elements 18a, the dielectric layer 144a, or a separate support surface 148. In these embodiments, it is not necessarily important how far upward the movable mirror 14 deflects, but rather that the conductive layer 142 is positioned to attract the mirror 14 at the appropriate time, such as to unstick the modulator 12. In other embodiments, the position of the movable mirror 14 as shown in FIG. 11C, may result in altered and desirable optical characteristics for the interferometric modulator. In these embodiments, the precise distance of deflection of the movable mirror 14 in the upward direction can be relevant in improving the image quality of the device.

As will be appreciated by one of skill in the art, the materials used to produce the layers 142, 144a, and support surface 148 need not be similar to the materials used to produce the corresponding layers 16, 105 and 20. For example, light need not pass through the layer 148. Additionally, if the conductive layer 142 is positioned beyond the reach of the movable mirror 14 in its deformed upward position, then the modulator 150 may not include the dielectric layer 144a. Additionally, the voltages applied to the conductive layer 142 and the movable mirror 14 can be accordingly different based on the above differences.

As will be appreciated by one of skill in the art, the voltage applied to drive the movable mirror 14 from the driven state of FIG. 11B, back to the undriven state of FIG. 11A, may be different than that required to drive the movable mirror 14 from the undriven state of FIG. 11A to the upward or reverse driven state of FIG. 11C, as the distance between the conductive layer 142 and movable mirror 14 may be different in the two states. Such requirements can depend upon the desired application and amounts of deflection, and can be determined by one of skill in the art in view of the present disclosure.

In some embodiments, the amount of force or duration that a force is applied between the conductive layer 142 and the movable mirror 14 is such that it only increases the rate at which the interferometric modulator transitions between the driven state and the undriven state. Since the movable mirror 14 can be attracted to either conductive layer 142 or the conductive mirror 16, which are located on opposite sides of movable mirror 14, a very brief driving force can be provided to weaken the interaction of movable mirror 14 with the opposite layer. For example, as the movable mirror 14 is driven to interact with fixed conductive mirror 16, a pulse of energy to the opposite conductive layer 142 can be used to weaken the interaction of the movable mirror 14 and the fixed mirror 16, thereby make it easier for the movable mirror 14 to move to the undriven state.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of driving an electromechanical system comprising a first electrode, a second electrode, and a movable electrode positioned between the first electrode and the second electrode and configured to move to at least two positions therebetween, the method comprising:
    applying a first voltage potential difference between the first electrode and the movable electrode so as to drive the movable electrode to a first position that is closer to the first electrode than the second electrode; and
    applying a second voltage potential difference between the second electrode and the movable electrode so as to drive the movable electrode to a second position that is between the second electrode and the first position.

2. The method of claim 1, wherein the second position is closer to the second electrode than the first electrode.

3. The method of claim 1, wherein the second position is closer to the first electrode than the second electrode.

4. The method of claim 1, wherein a first color is output when the movable electrode is in the first position.

5. The method of claim 4, wherein a second color is output when the movable electrode is in the second position.

6. The method of claim 4, wherein incident visible light is substantially absorbed when the movable electrode is in the second position.

7. The method of claim 1, wherein light of a first wavelength is reflected from the electromechanical system when the movable electrode is in the first position.

8. The method of claim 7, wherein light of a second wavelength is reflected from the electromechanical system when the movable electrode is in the second position.

9. The method of claim 7, wherein incident light of visible wavelengths is substantially absorbed when the movable electrode is in the second position.

10. The method of claim 1, further comprising applying a third voltage potential difference between the second electrode and the movable electrode so as to drive the movable electrode to a third position that is between the second position and the second electrode.

11. The method of claim 10, wherein a first color is output when the movable electrode is in the first position.

12. The method of claim 11, wherein incident visible light is substantially absorbed when the movable electrode is in the second position.

13. The method of claim 12, wherein a second color is output when the movable electrode is in the third position.

14. An electromechanical system comprising:
a first electrode;
a second electrode; and
a movable electrode disposed between the first electrode and the second electrode, the movable electrode being configured to move between at least a first position that is disposed closer to the first electrode than the second electrode and a second position that is disposed between the first position and the second electrode,
wherein applying a first voltage potential difference between the first electrode and the movable electrode drives the movable electrode toward the first position and wherein applying a second voltage potential difference between the second electrode and the movable electrode drives the movable electrode toward the second position.

15. The system of claim 14, wherein the first position comprises a position in contact with a dielectric layer.

16. The system of claim 14, wherein the second position comprises a position in contact with a dielectric layer.

17. The system of claim 14, wherein the second position is closer to the second electrode than the first electrode.

18. The system of claim 14, wherein the second position is closer to the first electrode than the second electrode.

19. The system of claim 14, wherein the first electrode is at least partially transparent.

20. The system of claim 19, wherein the first electrode comprises at least one layer of reflective material.

21. The system of claim 14, wherein the movable electrode comprises at least one layer of reflective material.

22. The system of claim 14, wherein the system reflects white light when the movable electrode is in the first position.

23. The system of claim 22, wherein the system reflects light in a range of visible wavelengths associated with a color when the movable electrode is in the second position.

24. The system of claim 22, wherein the system substantially absorbs incident visible light when the movable electrode is in the second position.

25. The system of claim 14, further comprising:
a processor that is configured to communicate with said electrode, said processor being configured to process image data; and
a memory device that is configured to communicate with said processor.

26. The system of claim 25, further comprising a driver circuit configured to send at least one signal to the electrode.

27. The system of claim 26, further comprising a controller configured to send at least a portion of the image data to the driver circuit.

28. The system of claim 25, further comprising an image source module configured to send said image data to said processor.

29. The system of claim 28, wherein the image source module comprises at least one of a receiver, transceiver, and transmitter.

30. The system of claim 25, further comprising an input device configured to receive input data and to communicate said input data to said processor.

31. A method of fabricating an electromechanical system, the method comprising:
forming a first electrode;
forming a second electrode disposed at a distance from the first electrode; and
forming a movable electrode disposed between the first electrode and the second electrode, the movable electrode being movable between at least a first position that is disposed closer to the first electrode than the second electrode and a second position that is disposed between the first position and the second electrode,
wherein the first electrode, second electrode, and movable electrode are formed such that applying a first voltage potential difference between the first electrode and the movable electrode drives the movable electrode toward the first position and such that applying a second voltage potential difference between the second electrode and the movable electrode drives the movable electrode toward the second position.

32. The method of claim 31, wherein forming the first reflector comprises forming a layer of conductive material.

33. The method of claim 32, wherein the layer of conductive material is at least partially transparent.

34. The method of claim 31, wherein forming the movable reflector comprises forming a layer of conductive material.

* * * * *

UNITED STATES PATENT AND TRADEMARK OFFICE
CERTIFICATE OF CORRECTION

PATENT NO.        : 8,213,075 B2
APPLICATION NO.   : 12/940884
DATED             : July 3, 2012
INVENTOR(S)       : Chui et al.

Page 1 of 1

It is certified that error appears in the above-identified patent and that said Letters Patent is hereby corrected as shown below:

In column 2 (page 3 item 56) at line 60, Under Other Publications, change "IEEEE" to --IEEE--.

In column 2 (page 4 item 56) at line 7, Under Other Publications, change "applicatons" to --applications--.

In column 2 (page 4 item 56) at line 16, Under Other Publications, change "dimenstion" to --dimension--.

In column 1 at line 26, change "and or" to --and/or--.

In column 3 at line 22, change "FIG." to --FIGS.--.

In column 6 at line 24, change "respectively" to --respectively.--.

Signed and Sealed this
Sixth Day of November, 2012

David J. Kappos
*Director of the United States Patent and Trademark Office*